UNITED STATES PATENT OFFICE.

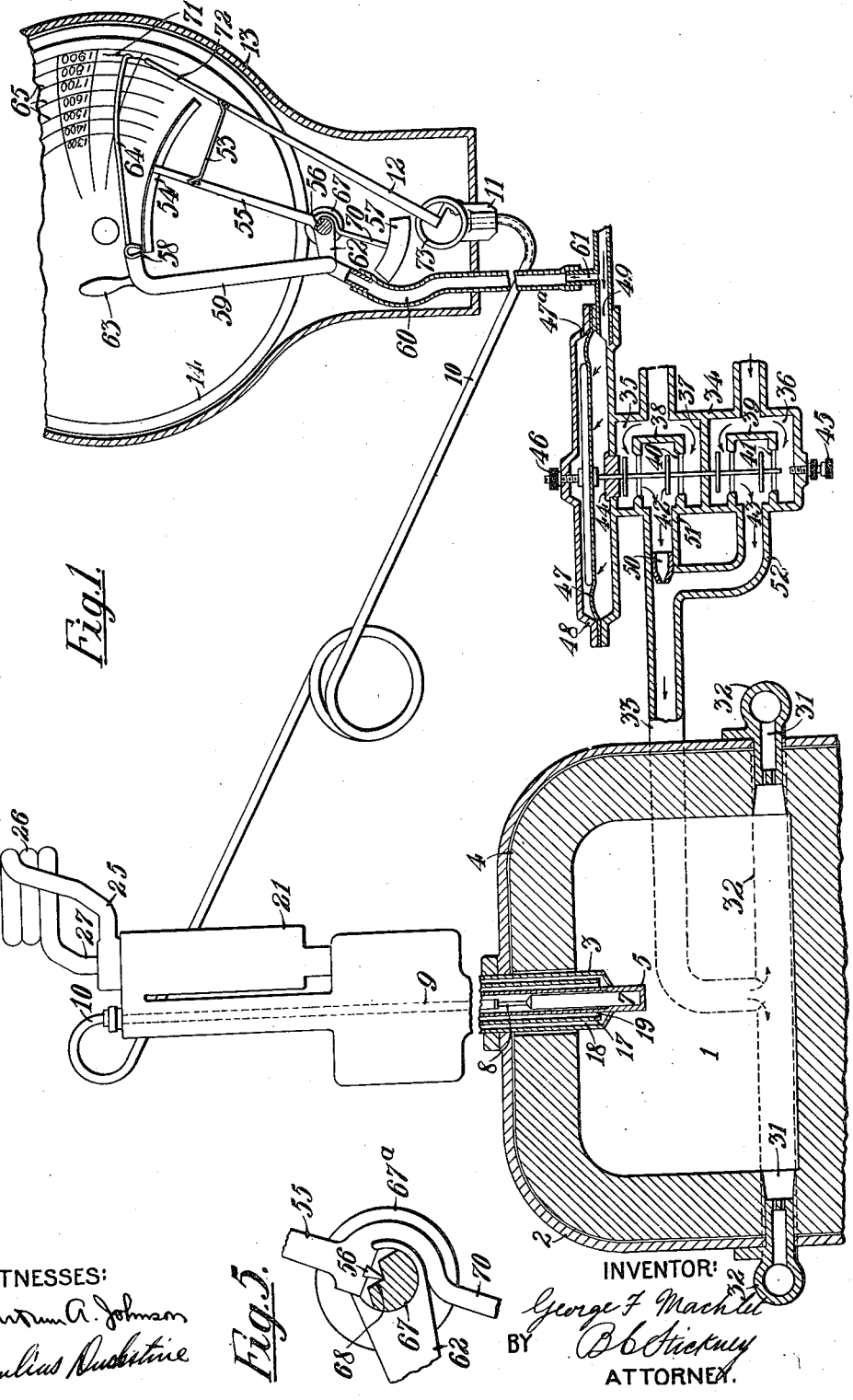

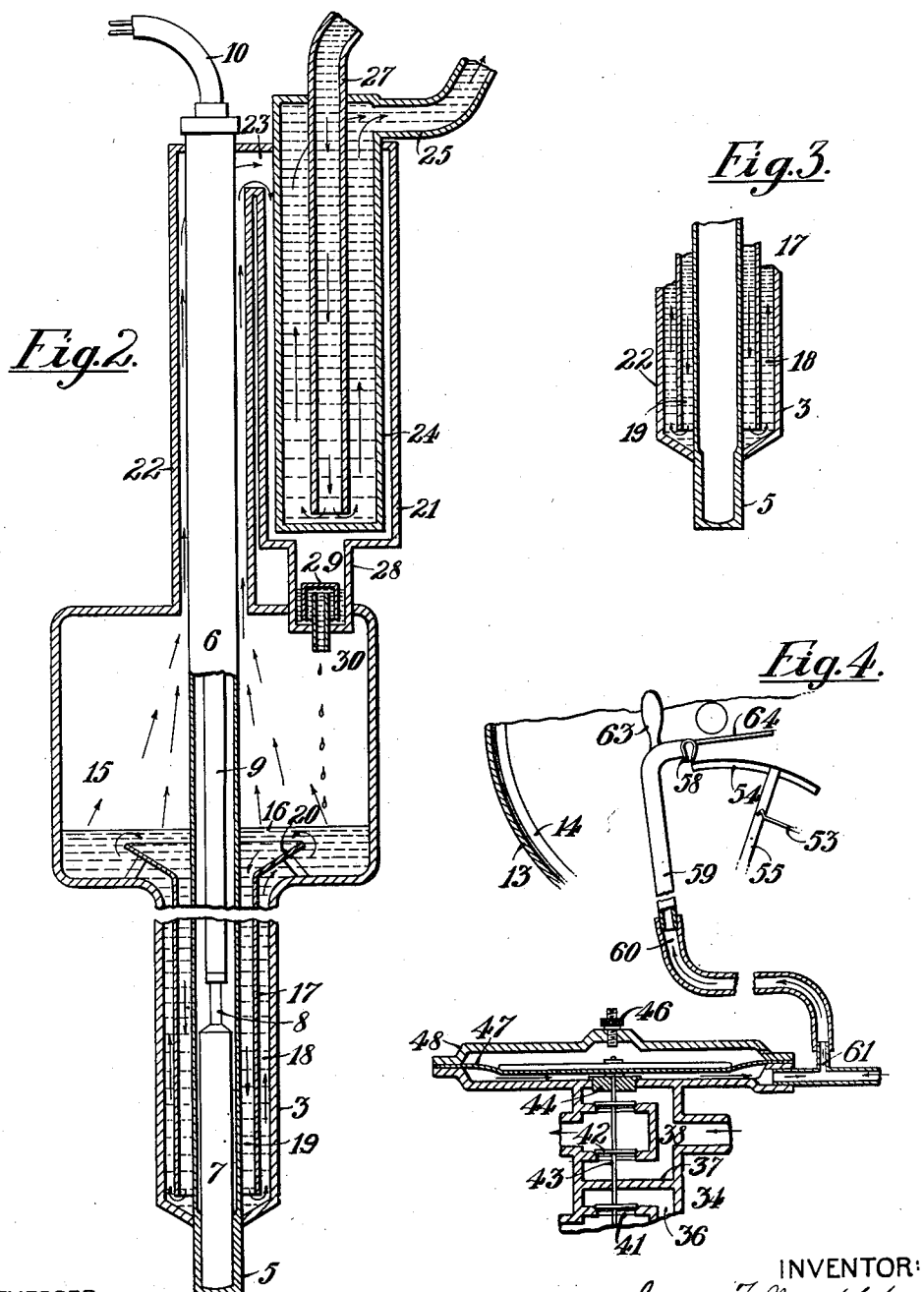

GEORGE F. MACHLET, OF ELIZABETH, NEW JERSEY.

FURNACE-REGULATING DEVICE.

1,306,015.   Specification of Letters Patent.   Patented June 10, 1919.

Original application filed December 21, 1914, Serial No. 878,207. Divided and this application filed July 26, 1917. Serial No. 182,862.

*To all whom it may concern:*

Be it known that I, GEORGE F. MACHLET, a citizen of the United States, residing in Elizabeth, in the county of Union and State of New Jersey, have invented certain new and useful Improvements in Furnace-Regulating Devices, of which the following is a specification.

This invention relates to means to regulate the heat of a furnace, especially in connection with pyrometers and other thermotic devices intended to be operated or affected by high heat. This application is a division of my application, Serial No. 878,-207, filed December 21, 1914.

A copper tube is inserted in a flask containing water, the lower end of the tube projecting below the flask in the form of a nipple to be exposed to the high heat. The water surrounding the tube absorbs a large portion of the heat of the tube; a condenser being provided for dissipating the heat which is absorbed by the water. The water remains always at the boiling point, that is, at a substantially fixed temperature, during the fluctuations of the heat in said tube. An exaggerated scale may be used, so that, for instance, an elevation of one degree in the actual heat of the thermotic device will read as four degrees on said scale.

The sheath comprises a tube to contain the thermotic device, and a water or liquid jacket therefor. A sheath of sufficient diameter in cross-section is used, to avoid liability of the water being pumped out of the sheath by the action of the steam bubbles rising therein. This portion of the sheath is divided by an internal partition into outer and inner channels, the outer channel for the rising hot water and bubbles, and the inner channel for the descending cooler water; the thermotic tube being within the inner channel, and hence not subject to the adverse influence of the steam bubbles, but always surrounded by the coolest portion of the water in the sheath.

The central thermotic tube may be jacketed throughout; the lower portion being jacketed by the hot water, and the upper portion by the steam rising from the water, so that uniformity of action of said tube is secured.

The steam rises from the main flask through a pipe containing said thermotic tube, and passes from the upper end of said pipe into the upper end of a condenser. In the latter is a trap through which the water of condensation drops back into the flask.

The heat of the furnace may be indicated in a variety of ways; the means illustrated in this instance being a pressure gage which has a movable indicator or needle attached to a spiral tube; a pipe leading from said spiral tube to a bulb, and the bulb being inserted in the bottom of the thermotic tube in said sheath. The bulb may contain a suitable liquid; and as the heat increases, the liquid evaporates, and the vapor, being confined, consequently increases in pressure, thereby affecting the spiral tube, which swings the needle. The invention, however, is not limited to this particular variety of device for indicating the heat of a member inserted in the thermotic tube; as other forms of pyrometers may be employed.

The needle may move across a disk, on which may be marked a scale to indicate the high heat which is being measured, said scale being exaggerated for the purpose already explained. The needle may have a pencil to make a record on the disk of the heat.

One feature is the provision of simple means for regulating the heat of the furnace. To said needle is connected a valve or closure to close a vent forming part of a heat-regulating train. This train includes a diaphragm, which is held up by compressed air, so long as said valve or closure keeps the vent or regulating port closed; but upon movement of the needle beyond the point of regulation, said vent or port will be opened, and the pressure of air will be reduced, and the diaphragm permitted to drop. To the diaphragm is connected a valve device which controls the flow of fuel to the furnace, and hence the supply of fuel is reduced. The temperature of the furnace lowers, and the needle moves back, the regulating port or vent is closed, and the diaphragm rises, thus opening the valve which permits more fuel to flow into the furnace. By this means the heat of the furnace, although very high, may be finely regulated.

Other features and advantages will hereinafter appear.

In the accompanying drawings,

Figure 1 is a diagrammatic sectional elevation showing a gas furnace having means for ascertaining and regulating the heat in the flame-chamber thereof. The bulb of a vapor-pressure or pneumatic thermometer is inserted within the heat-reducing and standardizing sheath, projecting through the wall of the furnace into the flame-chamber and terminating in a nipple containing said bulb. To the needle of the thermometer, which is preferably of the recording variety, is connected means for controlling a pneumatic heat-regulating valve in an air-and-gas mixer which supplies fuel to the furnace; the point at which regulation takes place being manually adjustable. The regulation-port is shown closed; the heat of the furnace being indicated at about the maximum desired heat, and the mixer valve being still open to supply fuel.

Fig. 2 is a central sectional elevation of the sheath, showing the bulb of the thermotic device inserted therein, and also showing the condenser.

Fig. 3 is a fragmentary section of the lower end of the sheath, with its interior tubular partition, dividing the same into downflow and upflow channels.

Fig. 4 is a fragmentary view similar to the right-hand portion of Fig. 1, but showing the regulation-port open, the heat of the furnace having increased beyond the maximum desired heat, and the valve being closed to temporarily cut off the supply of fuel.

Fig. 5 is a detail of a bearing for a regulating lever.

Into the flame-chamber 1 of a furnace 2 projects the sheath portion 3 of the invention, the same preferably extending down through the top 4 of the furnace. At its lower end the sheath terminates in a nipple 5, of copper, nickel or other suitable metal, which may be exposed to the flames of the furnace. This nipple 5 may merge into a long tube 6 supported centrally within the sheath, and inserted in said tube may be any desired thermotic device, as for instance a thermometer tube, as shown in my co-pending application No. 579,056, filed August 26, 1910 (Patent No. 1,193,911, dated August 8, 1916); but in the present instance, there is inserted in this tube 6 the bulb 7 of a recording thermometer, which may depend for its operation upon the pressure of the vapor of a liquid in the bulb 7 which is exposed to the temperature to be recorded. At its upper end the bulb terminates within the lower portion of the sheath, in a hollow stem or pipe 8, which may have a protecting jacket 9; the pipe and its jacket extending up from the sheath at 10, and being flexible and of considerable length, leading to the casing which contains the mechanism for turning the needle 12 of the thermometer 13, which may have a record disk 14.

The sheath 3 serves as a water or liquid jacket for the lower portion of the tube 6 containing the thermotic device; and at its upper end may open into an enlargement or flask 15, partly filled with water 16, so that the thermotic tube 6 is surrounded by a water jacket from the nipple 5 up to a point within the flask 15; the sheath 3 between the nipple 5 and the flask usually being very long, so as to gain sufficient advantage from the use of water or other heat-absorbing liquid having a substantially stable boiling point, for the double purpose of cooling the nipple 5 and thermotic tube 6 and establishing a practically stable standard or normal temperature, to insure that fluctuations in the actual heat of the nipple 5 and tube 6 shall be proportionate to the fluctuations in the actual heat of the furnace; such standard or normal temperature being far below the temperature to which the sheath is actually exposed.

The diameter or transverse capacity of the sheath or well 3 is made so great as to avoid or eliminate the possibility of pumping action due to the formation of steam bubbles in the lower portion of the well. When the sheath, tube or well 3 is made narrow, bubbles are apt to form of sufficient size to fill the cross-section of the well, and these bubbles tend to lift the water out of the well, and hence interfere with the function of the cooling and heat-standardizing sheath; but this difficulty may be avoided by making the well of such large transverse section or area that no pumping action of the bubbles can take place, whereby the well is kept always filled with water, with resultant uniformity and reliability of action.

The well 3 is divided by an interior tubular portion 17 into outer upflow channel 18 and inner downflow channel 19, thus securing smoothness of flow, and insuring that the coolest portion of the water in the tube shall flow directly upon the thermotic tube 6. The bubbles will mainly or altogether rise in the outer channel 18, and hence not be apt to impair the efficiency or steadiness of the tube 6, as a standardizer of heat, the submerged portion of said tube being always in contact with water throughout which is but little if any impregnated with steam bubbles. The outer channel 18 is of sufficient diameter to prevent being pumped out by steam bubbles. At its upper end the partition-tube 17 may terminate within the flask in a flaring or funnel-like mouth 20, of such proportions as to gather a large proportion of the cooler water settling in the flask.

A device is provided at 21 for condensing the steam rising in the flask 15. This condenser may be arranged above the flask; the steam rising in a pipe 22, which at its upper end opens at 23 into the upper end of the condenser 21; the later containing a tank 24, from the upper end whereof leads an outlet pipe 25 to a cooling coil 26 (Fig.

1), from which extends an inlet pipe 27 terminating in the lower portion of the tank 24. The water of condensation accumulating in a well 28 in the bottom of the condenser, passes through a trap 29 provided in the top of flask 15, and drops into the flask; the trap being in the form of an inverted cup within which the condensed water rises, and up into which extends an outlet tube 30 through which the water drops. The trap will prevent steam from rising directly from the flask into the lower portion of the condensation chamber.

The portion of the thermotic tube 6 within the flask 15 is of course jacketed with steam, and the pipe 22 forms a continuation of the steam jacket; whereby the tube 6 may be entirely jacketed, its upper portion with live steam and its lower portion with the water from which the steam rises; thus aiding in establishing the desired standard or normal or unfluctuating temperature, surrounding the tube 6, since the jacketing tends to shield the thermotic tube 6 from all influences or eliminate all influences, which would affect its heat, save the exposed nipple 5 which is exposed to the heat whose temperature is to be ascertained or otherwise utilized by the thermotic device in tube 6. The well 3, taken with the flask 15 and the pipe 22, may be taken as comprising a sheath for the thermotic tube 6, for protecting the tube 6 and establishing a normal or standard temperature far below the actual temperature to which the device is exposed.

The furnace flames may be produced by burners 31, connected to feed pipes 32, receiving the fuel from a supply pipe 33. This pipe connects with a gas and air mixing apparatus, comprising a chest 34 having separate gas and air chambers 35, 36, into which said chest is divided by a partition 37. The gas chamber contains an outlet box 38, and the air chamber contains an outlet box 39. The gas outlet box has opposite upper and lower ports 40, and the air outlet box has similar ports 41. All four ports are in line. There are four valves 42, one for each port, all valves fixed upon a single vertical stem 43, guided partly in partition 37, and partly in a bushing 44 in the top of the chest. All four ports are closed simultaneously or opened simultaneously. An adjustable stop 45 may be provided for limiting the closing movement, so that the supply of the fuel to the furnace shall not be reduced below a certain minimum, which may be set at any desired point. The lifting of the valves may also be regulated by an adjustable stop 46.

The valve stem 43 is fixed at its upper end to a weighted flexible diaphragm 47 mounted in an air-tight chamber 48, having an inlet pipe 49 below the diaphragm, for compressed air, and a vent 47$^a$ above the diaphragm. The pressure of the compressed air below the diaphragm keeps the same raised and the valves 42 open; but if the pressure of the compressed air should fall, the weighted diaphragm would drop, and the valves 42 close more or less, to diminish the supply of fuel to the furnace, dependent upon how much the pressure in 48 is reduced. The mixer insures uniform proportion of gas and air during all fluctuations in the volume of the mixture delivered thereby. Preferably a jet 50 is provided in the discharge orifice 51 of the air chamber, which may be arranged at the junction of the elbow-shaped outlet 52 of the gas chamber with the supply pipe 33.

For controlling the pressure of air in the lower part of diaphragm chamber 48, and thereby regulating the supply of fuel to the furnace, the needle or movable member of the mechanical thermometer (or other device under the control of the heat of the furnace) may be connected by a link 53 with a closure 54, the latter mounted on the end of an arm 55, pivoted at 56 preferably above the pivot of needle 12. The closure 54 may be counterbalanced by a weight 57 to secure ease and reliability of action; and the link 53 may work on knife-edge pivots as shown; both these provisions tending to secure delicacy of automatic regulation of the heat of the furnace. The closure 54 is arc or segment-shaped, and is designed to close a regulation-port 58 leading to the inlet 49 of the diaphragm chamber 48. When the port 58 is open, the pressure in the diaphragm chamber is reduced, and the supply of fuel to the furnace diminished accordingly. The connection from the regulation-port 58 to the inlet 49 comprises a hollow arm or tube 59, and a flexible tube 60, the latter fitting on a nipple 61 in the inlet 49.

The degree of heat at which regulation shall take place may be predetermined by manual adjustment of the regulation-port 58 along the segmental closure 54; the tube 59 for this purpose being carried upon an arm 62, pivoted concentrically with the arm 53 and segment 54. The tube may be provided with a handle 63, and also with an index 64, to coöperate with the same graduations 65 on the disk 14 as the needle 12. The attendant grasps handle 63 and swings arm 59 around its pivot, setting the regulation port 58 to the right or left until the index 64 points to the desired graduation on the disk or scale 14. Then as the furnace heats up, the segment 54 will be swung to the right by the needle 12 until the regulation-port 58 is partly or wholly uncovered, whereupon air pressure in diaphragm chamber 48 will diminish, and the supply of fuel to the furnace will be cut down. Upon the consequent reduction of the heat of the furnace, the needle 12 will swing to the left, closing the port 58, permitting the supply of compressed air to lift the diaphragm 47 and increase the supply of fuel to the furnace. By this means the regulation of the heat of the furnace may be made extremely fine and kept almost exactly uniform, even at very high heats, such as 2000 degrees Fahrenheit and above. The air inlet may be connected to a compressed air supply. The port 58 may be made very narrow as shown, so that a very slight movement of the closure will open or close the same; but the breadth of the closure and of the port 58 may be great enough to insure efficiency of the regulation notwithstanding the narrowness of the port as seen at Fig. 1. In other words the port may be much broader than it is wide.

As seen at Fig. 5, the manually adjustable arm 62 may be fixed upon a pivot-stud 67, which may have a friction collar 67$^a$, or may be fitted tightly in its bearing, so that the arm 62 and port 58 will be held where adjusted. In this pivot-stud may be formed a V-shaped depression 68 extending along the stud, to contain a knife-edge 56 projecting down from the lower end of closure-arm 55. The provision of the knife-edges at the various points shown, renders the action very delicate and reliable; and the vibration of the knife-edge 56 will be very slight in its bearing 68, since the latter is shifted around by means of the handle 63 to the point at which the work of the knife-edge 56 is to be done. The counterweight 57 may be carried upon an arm 70, which may be of hook form and attached to arm 55 at a point above the knife-edge 56, as shown at Fig. 5. The thermometer scale is graduated according to the actual heat of the furnace, as shown, the notations on the scale being far in excess of the actual heat of the thermotic device itself. A record 71 may be made on the disk 14 by means of a pencil tip 72 on the end of needle 12. Said pencil may be clipped or fastened directly upon the outer end of a helical tube 73, seen in edge view, the inner end of this tube being fixed, and in communication with the bulb 7 through the pipe 8, 10. Heating the liquid in the bulb 7 increases the pressure of the vapor in the pipe 8 and helical tube 73, causing the outer end of the latter to turn, thus swinging the needle 12.

The invention, however, is not limited to this particular form of thermotic pressure gage, as other gages or other thermometers or pyrometers may be used.

Certain features herein disclosed are claimed in said application, 878,207; the claims in said application being directed to pyrometers, while the claims in this application are directed to furnace-regulating devices.

Variations may be resorted to within the scope of the invention, and portions of the improvements may be used without others.

Having thus described my invention, I claim:

1. The combination with a furnace, of a sheath projecting within said furnace and containing a heat-absorbing medium in the form of a liquid to establish a standard or normal temperature for the sheath far below the heat of the furnace, and to form a protection against the heat of the furnace, and a device for automatically regulating the heat of said furnace, including a part inserted in said sheath to be affected according to the fluctuations of the heat of the furnace.

2. The combination with a furnace, of a sheath projecting within said furnace and containing a heat-absorbing medium in the form of a liquid to establish a standard or normal temperature for the sheath below the heat of the furnace, and to form a protection against the heat of the furnace, a device for automatically regulating the heat of said furnace, including a part inserted in said sheath to be affected according to the fluctuations of the heat of the furnace, and also including a part caused to vibrate in accordance with such fluctuations, and a furnace-controlling valve mechanism controlled by said vibrating part.

3. The combination of a sheath containing a heat-absorbing medium in the form of a liquid to establish a standard or normal temperature for the sheath far below the temperature to which the sheath is actually exposed, and to form a protection against injury by the heat, a thermotic device including a heat-indicating needle and also including a bulb inserted in said sheath and pneumatically connected to said needle to cause it to move to indicate fluctuations of heat of said bulb, a furnace in which said sheath is inserted, and a device controlled by said needle to regulate the heat of said furnace.

4. The combination of a sheath containing a heat-absorbing medium in the form of a liquid to establish a standard or normal temperature for the sheath far below the temperature to which the sheath is actually exposed, and to form a protection against injury by the heat, a thermotic device including a heat-indicating needle and also including a bulb inserted in said sheath and pneumatically connected to said needle to cause it to move to indicate fluctuations of heat of said bulb, a furnace in which said sheath is inserted, a device controlled by said needle to regulate the heat of said furnace, and means manually adjustable to determine the point of regulation.

5. The combination of a sheath containing a heat-absorbing medium in the form of a liquid to establish a standard or normal temperature for the sheath far below the temperature to which the sheath is actually exposed, and to form a protection against injury by the heat, a thermotic device including a heat-indicating needle and also including a bulb inserted in said sheath and pneumatically connected to said needle to cause it to move to indicate fluctuations of heat of said bulb, a furnace in which said sheath is inserted, a device controlled by said needle to regulate the heat of said furnace, means manually adjustable to determine the point of regulation, said regulating device including a pivoted segment or closure connected to said needle, and a pneumatic device having a regulating port kept closed by said segment during the principal portion of the stroke thereof effected by said needle, and said manually adjustable means connected to shift said regulating port relatively to said segment, to vary the point at which the segment shall close and open the port.

6. The combination of a pivoted closure, a heat-regulating device having a regulating port across which said pivoted closure sweeps, automatic means for moving said closure, and manually operable means for adjusting said port to vary the point of automatic regulation.

7. The combination of a closure in the form of a segment pivoted to bring different portions of the segment into use, automatic means for moving said closure, and a pneumatic heat-regulator including a leg provided with a regulating port to coöperate with said closure and mounted for manual adjustment concentrically with said segment, to vary the point at which said closure shall open and close said port.

8. The combination of a graduated dial, an indicator to coöperate with said dial, a furnace, means for automatically vibrating said indicator in accordance with the fluctuations of heat in said furnace, a pivoted closure connected to said indicator, and a pneumatic heat-regulator connected to said furnace and including a part provided with a regulating port and adjustable manually along said closure to vary the point of regulation of the furnace.

9. The combination of a graduated dial, an indicator to coöperate with said dial, a furnace, means for automatically vibrating said indicator in accordance with the fluctuations of heat in said furnace, a pivoted closure connected to said indicator, and a pneumatic heat-regulator connected to said furnace and including a part provided with a regulating port and adjustable manually along said closure to vary the point of regulation of the furnace, said adjustable part provided with an index to coöperate with the scale on said dial.

10. The combination of a graduated dial, a needle, a furnace, means for automatically vibrating said needle in accordance with the fluctuations of heat in said furnace, a pivoted closure connected to said needle, and a pneumatic heat-regulator connected to said furnace and including a part provided with a regulating port and adjustable manually along said closure to vary the point of regulation of the furnace.

GEORGE F. MACHLET.

Witnesses:
PHILIP C. OSTERMAN,
SAMUEL R. OGDEN.